US006993798B1

(12) United States Patent
Roberts

(10) Patent No.: US 6,993,798 B1
(45) Date of Patent: Feb. 7, 2006

(54) METHOD AND APPARATUS FOR LEVELING A TRANSPORTABLE BED ASSEMBLY

(76) Inventor: Noel Thomas Roberts, 7771 Michael La., Ventress, LA (US) 19317

( * ) Notice: Subject to any disclaimer, the term of this patent is extended or adjusted under 35 U.S.C. 154(b) by 67 days.

(21) Appl. No.: 10/630,491

(22) Filed: Jul. 30, 2003

(51) Int. Cl.
A47C 17/80 (2006.01)
B60P 3/38 (2006.01)

(52) U.S. Cl. .......... 5/118

(58) Field of Classification Search .......... 5/118, 5/614, 615, 111, 114; 296/190.02
See application file for complete search history.

(56) References Cited

U.S. PATENT DOCUMENTS

| | | | | |
|---|---|---|---|---|
| 1,303,487 | A * | 5/1919 | McCune | 5/118 |
| 1,554,310 | A * | 9/1925 | Trepele | 5/118 |
| 2,070,960 | A | 2/1937 | Phillips | 254/93 |
| 2,495,092 | A | 1/1950 | Cox et al. | 254/93 |
| 2,602,938 | A * | 7/1952 | Williams | 5/118 |
| 2,609,177 | A | 9/1952 | Hughes | 254/93 |
| 2,616,098 | A * | 11/1952 | Love | 5/118 |
| 2,769,182 | A | 11/1956 | Nunlist | 5/68 |
| 2,804,118 | A | 8/1957 | Bayerkohler | 153/32 |
| 2,918,682 | A | 12/1959 | Thoresen et al. | 5/327 |
| 3,299,447 | A * | 1/1967 | Dome | 5/118 |
| 3,371,359 | A | 3/1968 | Dome | 5/118 |
| 3,392,412 | A | 7/1968 | Aymar | 5/327 |
| 3,426,373 | A | 2/1969 | Scott et al. | 5/348 |
| 3,606,623 | A | 9/1971 | Aymar | 5/327 B |
| 3,667,075 | A | 6/1972 | Ballard et al. | 5/348 |
| 3,760,436 | A | 9/1973 | Zach et al. | 5/118 |
| 3,781,928 | A | 1/1974 | Swallert | 5/68 |
| 4,142,263 | A | 3/1979 | Pierson | 5/68 |
| 4,144,601 | A | 3/1979 | Anderson et al. | 5/118 |
| 4,196,483 | A | 4/1980 | Lefler et al. | 5/118 |
| 4,309,783 | A | 1/1982 | Cammack et al. | 5/508 |
| 4,527,298 | A | 7/1985 | Moulton | 5/66 |
| 4,572,579 | A | 2/1986 | Saito | 298/1 A |
| 4,669,139 | A | 6/1987 | Richter, Jr. | 5/118 |
| 4,807,313 | A | 2/1989 | Ryder et al. | 5/62 |
| 4,979,248 | A * | 12/1990 | Kelley | 5/118 |
| 4,989,281 | A | 2/1991 | Christensen | 5/118 |
| 5,218,728 | A | 6/1993 | Lloyd et al. | 5/118 |
| 5,313,679 | A | 5/1994 | Yamaguchi | 5/659 |
| 5,446,938 | A | 9/1995 | Warner et al. | 14/71.3 |
| 5,598,591 | A | 2/1997 | Kelley | 5/118 |
| 5,638,560 | A | 6/1997 | Rigdon et al. | 5/118 |
| 6,311,348 | B1 | 11/2001 | Luff et al. | 5/618 |
| 6,505,363 | B2 * | 1/2003 | Davis | 5/118 |
| 6,631,526 | B1 * | 10/2003 | Enright | 5/118 |
| 6,671,900 | B2 * | 1/2004 | Davis | 5/118 |
| 6,718,574 | B1 * | 4/2004 | Bradley et al. | 5/118 |

* cited by examiner

*Primary Examiner*—Michael Safavi
(74) *Attorney, Agent, or Firm*—Head, Johnson & Kachigian

(57) ABSTRACT

An adjustable and transportable mattress support for adjustably supporting a mattress in the cab of a truck including a pivotally connected elongated mattress support member for supporting a mattress; a vertical adjusting system located between the mattress support member and the floor portion of the truck cab, the vertical adjusting system including an expandable gaseous fluid cushion means being expandable and contractable in a vertical direction located between the truck cab floor and the mattress support member; means for applying a gaseous fluid under pressure to expandable cushion means located generally at the corners of the mattress support member between the member and truck cab floor whereby the vertical position of the mattress support member can be adjusted.

5 Claims, 4 Drawing Sheets

METHOD AND APPARATUS FOR LEVELING A TRANSPORTABLE BED ASSEMBLY

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The invention relates to an adjustable mattress support arrangement for adjustably supporting a mattress in the cab of a vehicle such as a truck. More specifically, the invention relates to an arrangement which utilizes expandable air cushions positioned between a rectangularly shaped mattress and a truck cab floor generally at each of the four corners of the rectangularly shaped mattress support member with said member in turn being comprised of pivotally connected first and second sections.

BRIEF SUMMARY OF THE INVENTION

It is an object of the invention to provide a lightweight, adjustable, and easily transportable mattress support apparatus which includes individually expandable air cushion means.

It is a further object of the invention to provide a lightweight adjustable, easily transportable mattress supporting apparatus which provides for independent operation and leveling capability at each corner of a rectangularly shaped mattress support corner.

It is still a further object of the instant invention to provide a lightweight, adjustable and easily transportable mattress support arrangement whereby an essentially level sleeping surface can be provided by independently adjusting on expandable, gaseous fluid cushion means removably positioned between a truck cab floor and a mattress support member.

It is yet another object of the invention is to provide a mattress support member which has pivotally connected front and rear sections wherein said sections may be folded for storage convenience or unfolded to form a sleeping accommodation.

It is a further object of the invention to provide for independent adjustment of expandable, gaseous fluid cushion means via a valving means connected to each of a plurality of expandable cushion means and a vehicle's compressed air supply.

Various attempts to provide adjustable sleeping surfaces as beds have been addressed in the prior art. However, the contemporary art is woefully deficient disclosing a means by which a sleeping surface such as a mattress supported by a mattress support system may be adjusted at multiple points to provide a level or otherwise comfortable sleeping combination. A case in point, would be the situation encountered by most over-the-road (OTR) transport vehicles such as tractor trailer rigs. Most tractor trailer rigs the cab portion (tractor) typically provides for space for sleeping accommodation behind the driver's/passengers' seating area. However, as a level parking surface may not always be available to the tractor/trailer operator, the operator typically finds him or herself facing the situation wherein the truck is on uneven ground or, more specifically, presents an angled orientation which does not lend itself to a comfortable sleeping position.

The instant invention addresses the deficiency in the prior art by disclosing and claiming a mattress support system which allows for at least four points of individual adjustment. This adjustment is facilitated by a valving means which is attached to the tractor trailer compressed air supply and each of a plurality of expandable cushion means such as bellows. The bellows are placed typically in the general area of the corners of the mattress support member and the truck floor to allow the operator to individually adjust each expandable cushion to a desired height thus facilitating a level or otherwise comfortable sleeping surface for the individual operator. Various leveling devices, though deficient, have been disclosed in the prior art.

Phillips (U.S. Pat. No. 2,070,960) relates to fluid hoists or jacks of a small compact, portable fluid jack of relatively great power so as to easily lift an automobile by means of a tire pump or compressed air available in most service stations, and which jack is also adapted for use in combination with the large hydraulic or air hoists in common use in service stations for subsequent lifting of the weight from the springs of an automobile after the automobile has been elevated by the large hydraulic jack.

Nunlist (U.S. Pat. No. 2,769,182) discloses an apparatus for lifting selected portions of a mattress and more particularly to an inflatable mattress lifter.

Bayerkohler (U.S. Pat. No. 2,804,118) relates to improvements in pneumatic jacks for straightening automobile body parts especially although not necessarily. The primary object of the invention is to provide a pneumatic jack of the bellows type adapted for use in straightening automobile bodies and fenders where, because of space limitations, it is impossible to use other types of jacks.

Aymar (U.S. Pat. No. 3,392,412) relates to a bedrest which may be conveniently placed under a mattress for raising and lowering a portion of the mattress, such as the portion constituting the head and backrest of the user, or the portion upon which his feet are located.

Scott (U.S. Pat. No. 3,426,373) discloses an inflatable under-mattress comprises a base member having at each longitudinal side thereof an inflatable chamber. The chambers are independently inflatable. Each chamber is so shaped that when inflated the upper surface thereof is inclined downwardly towards the center of the under-mattress. Each chamber has one longitudinal side extending along the length of the under-mattress along one side thereof. The other side of each chamber is so shaped as to increase the width of the chamber from the foot end to the head end of the under-mattress.

Aymar (U.S. Pat. No. 3,606,623) discloses a bellows assembly for a pneumatically operated adjustable bedrest is provided with integral channel means whereby pressurized air is introduced into what will ultimately be the wider end of the inflated bellows and is then channeled down into the opposed end or apex of the V-shaped bellows. From the apex the pressurized air is then free to move into the separate chambers defined by the channels and the adjacent confronting layers of the bellows. This provides a mechanical advantage which permits smooth elevating action.

Ballard et al. (U.S. Pat. No. 3,667,072) discloses a mattress, as for a hospital bed, an assembly of inflatable bellows spring segments being interposed between the under side of the mattress and a support box therefor which may be said to correspond to the conventional bed spring supporting slats under the springs of conventional mattresses. All of the adjustments offered by conventional hospital bed frames, and more, may be made for the mattress of this invention by virtue of the shapes into which the combinations of spring bellows segments may be inflated. The invention, in effect, employs a careful selection of bellows spring segment shapes, not only to provide a wide range of positional adjustments of the mattress, but these segments may serve, cooperatively, to provide the springs of the mattress, also with the degree of spring or cushioning effect being infinitely adjustable by virtue of the selective inflation of bellows segments, and the selectivity provided as to degree of inflation of the respective bellows.

Swallert (U.S. Pat. No. 3,781,928) discloses a device for raising an lowering the head end and/or foot end of a mattress of a bed from a bedstead comprising an inflatable pad positioned at the head end and/or foot end of the bedstead between the bedstead and the mattress to raise or lower the associated end of the mattress. The pad is mounted in a frame which is composed of upper and lower hinged U-shaped parts each of which includes a plate of thin rigid material flexedly attached to the parallel legs of the associated frame part. The pad is attached only to the plate of the bottom part and is free to slide on the plate of the upper part when the mattress is raised and lowered in the course of inflation and deflation of the pad.

Pierson (U.S. Pat. No. 4,142,263) discloses an improvement in mechanisms for elevating a mattress on a bed by a simple inflatable pillow inserted under the mattress and of novel prismatic geometrical construction enabling highly flexible adaptability of use and simplicity of operation.

Ryder et al. (U.S. Pat. No. 4,807,313) discloses a system for selectively supporting a mattress at a predetermined angle of inclination with respect to a support surface, such as a box spring, or the like. The system comprises primarily an inflatable mattress support member which is connected to a selectively operable pneumatic pump via a combination check valve and release valve. In practice, the user or patient can inflate the mattress support member to provide the desired degree of inclination and when not in use the support member can be easily deflated to dispose the mattress in a relatively normal position. The mattress support member is provided by a plurality of adjacent interconnected inflatable cells, with the adjacent cells sharing a common wall portion having port means formed therein to pneumatically interconnect the respective cells. The cells are of declining size, starting at a first end of the inflatable mattress support member and progressing toward the opposite, second end thereof, and preferably ten or more cells are provided. The construction of the mattress support member is provided by a pair of sheet members which are bonded together about the periphery thereof, and are further bonded together at selected areas intermediate the ends thereof, which selected areas of bonding are spaced apart by varying distances and extend generally across the width of the mattress support member, except for those locations wherein the bonding is interrupted to provide openings or ports between the respective cells.

Yamaguchi (U.S. Pat. No. 5,313,679) discloses a bed having a base, a mattress, and a system for moving the mattress up and down for helping a person make the bed, and can be preferably adapted in a guest room of hotels or the like. The present invention provides a bed comprising a base, a mattress provided on a top face of the base, a pair of inflatable means provided between the mattress and the base, and an air-supplying tube connected with said inflatable means, wherein one of the inflatable means is laid on one side of the top surface of the base, while the other is laid on the other side of the top surface of the base, and each inflatable means is independently connected to an air-supplying means through the air-supplying tube.

In view of the limitations and disadvantages of the afore-cited prior art, it is apparent that what is needed is a method and apparatus for leveling a transportable bed assembly at least four points of adjustment a need and exceeded by the instant invention. Consequently, it is an object of the instant invention to provide a lightweight, adjustable and easy transportable mattress support apparatus which includes individually expandable air cushion means.

BRIEF DESCRIPTION OF THE DRAWINGS

The invention will be better understood by an examination of the following description, together with the accompanying drawings, in which.

DETAILED DESCRIPTION OF THE PREFERRED EMBODIMENT

Figure 1:
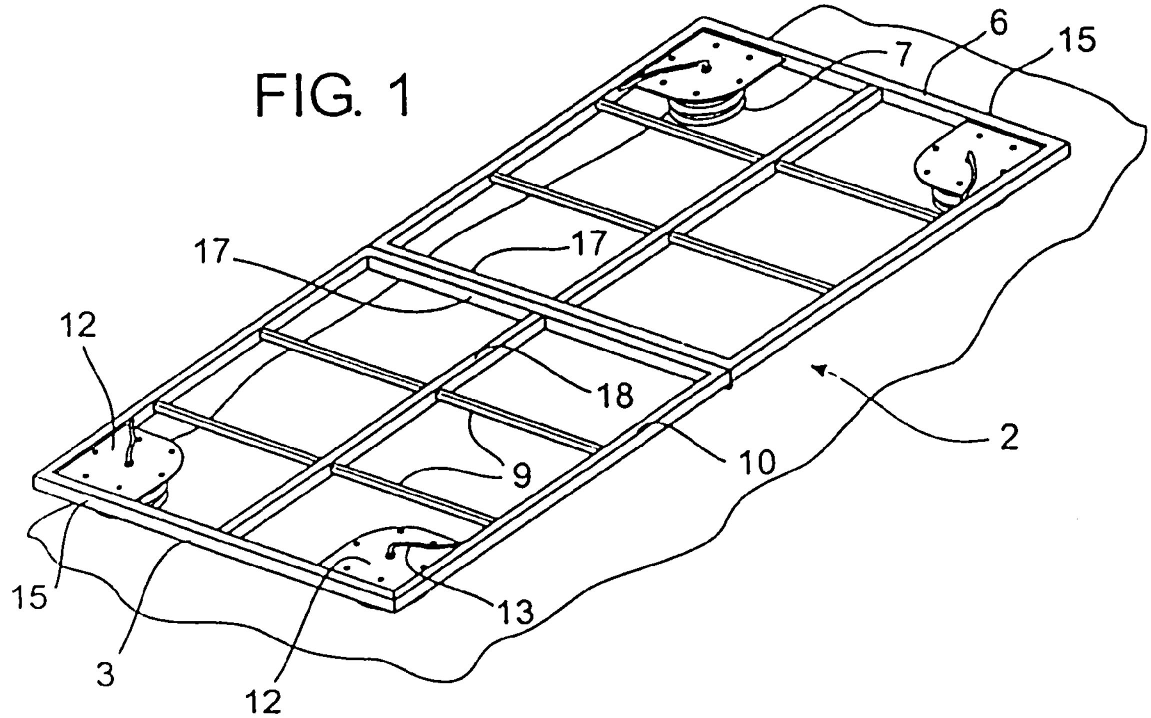
FIG. 1 illustrates the pivotally connected front and rear halves of the present invention in an unfolded state with expandable cushions deflated.

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

As seen in the embodiment illustrated in FIGS. 1–8, the adjustable and transportable mattress support arrangement 2 of the instant invention is comprised of identically structured pivotally attached front and rear halves (3,6). Each of said halves (3,6) is structured such that a plurality of cross support members 9 intersect and are attached to a longitudinal support member 8. The longitudinal support member 8 traverses the length of each respective half (3,6) and intersects and is attached to a front cross support member 15 and rear support member 17.

Further illustrated in FIG. 1 are inflatable and expandable cushions 7 (shown in a deflated state) and expandable cushion top positioning plates 12 with pressurized gas means 13 inserted through said top positioning plate 12 to provide for independent inflation of each of said expandable cushions 7. It is to be noted that in practice of the instant invention has been found to be most efficient when said expandable cushions are of an accordion bellows structure and are positioned generally at structured corners located at the intersection of side frame member 10 and front frame member 15.

Figure 2:
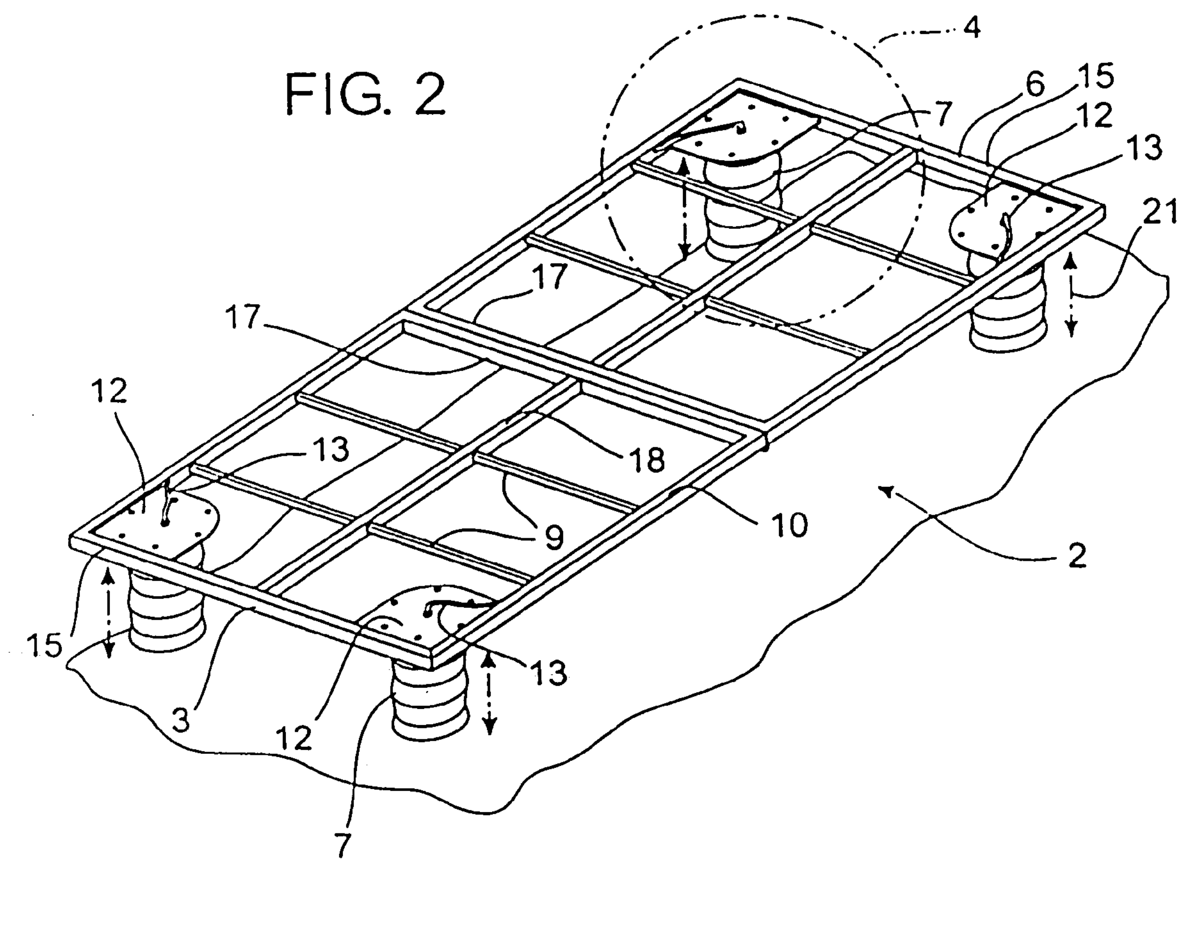
FIG. 2 illustrates the mattress support member of FIG. 1 with the expandable cushions inflated thus raising said mattress support member vertically from a truck cab floor.

In FIG. 2, the mattress support member 2, supports the expandable cushions of the instant invention 7 shown in an inflated state wherein the front and rear halves of the mattress support member (3,6) are shown elevated indicated by line 21. It is important to note that the instant invention provides for separate pressurized air sources to be directed to each of said cushions 7 by independent pressurized air hoses 13. Consequently, the instant invention affords adjustment accommodation at four points of reference (each expandable cushion raised to a distinguishable height).

Figure 4:
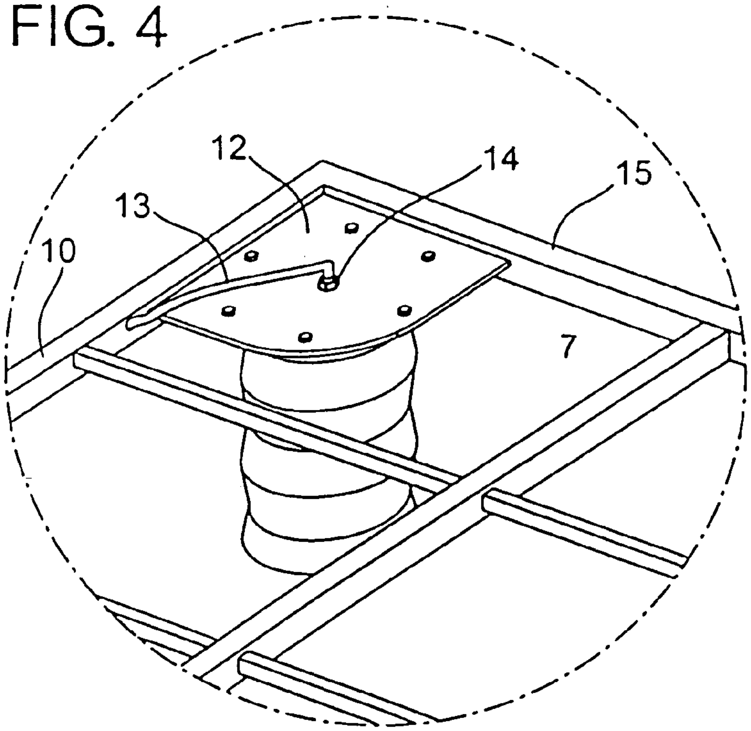
FIG. 4 illustrates the expandable cushion of the instant invention providing further detail with respect to the pressurized air source line typically used in association with a truck braking system.

As illustrated in FIG. 2, FIG. 4 will provide greater detail with respect to said pressurized air hoses 13 and expandable cushions 7.

Figure 3:
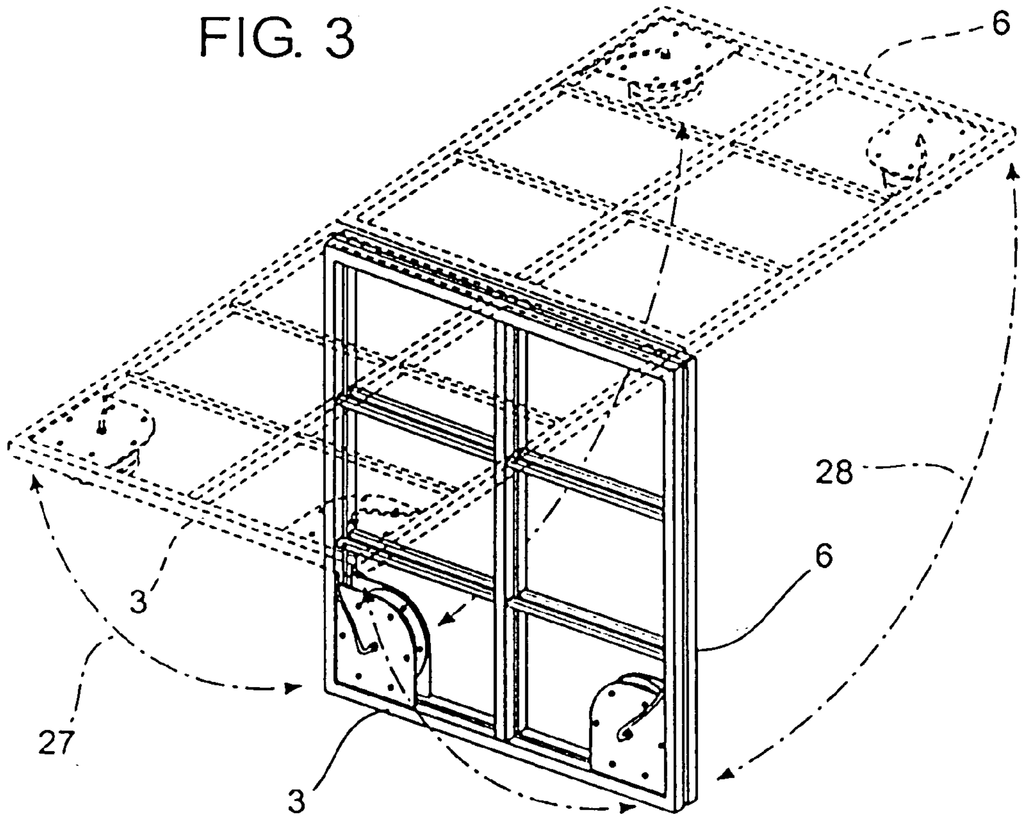
FIG. 3 illustrates the pivotal connections of the invention's front and rear halves showing opening and closing arch's attendant thereto.

FIG. 3 shows the pivotally attached front and rear halves (3,6) of the adjustable and transportable management support unfolded in phantom and then in a folded or stored state with such folding/storage accommodated via the pivotal arching designated by lines 27 and 28. The pivotal connection of the instant invention is effectuated via hinging means well known and practiced by those skilled in the art.

FIG. 4, the expandable cushion of the instant invention, shows the pressurized air hose means 13 as shown attached to the top securing plate 12 via a nut or other securing means well known to those in the art. The pressurized air hose means extends though the top support plate 12 allowing for the introduction of air or other compatible gas to expand the expandable cushion 7.

As indicated in association with FIG. 2, each of the expandable cushions of the instant invention may be actuated individually to accommodate four points of reference with respect to height adjustment. Said individual height adjustment is facilitated via a valving means (not shown) well known to those skilled in the art wherein one generalized air pressure source enters said valving means and further sub-divides to allow introduction to a plurality of subservient air hoses 13.

Figure 5:
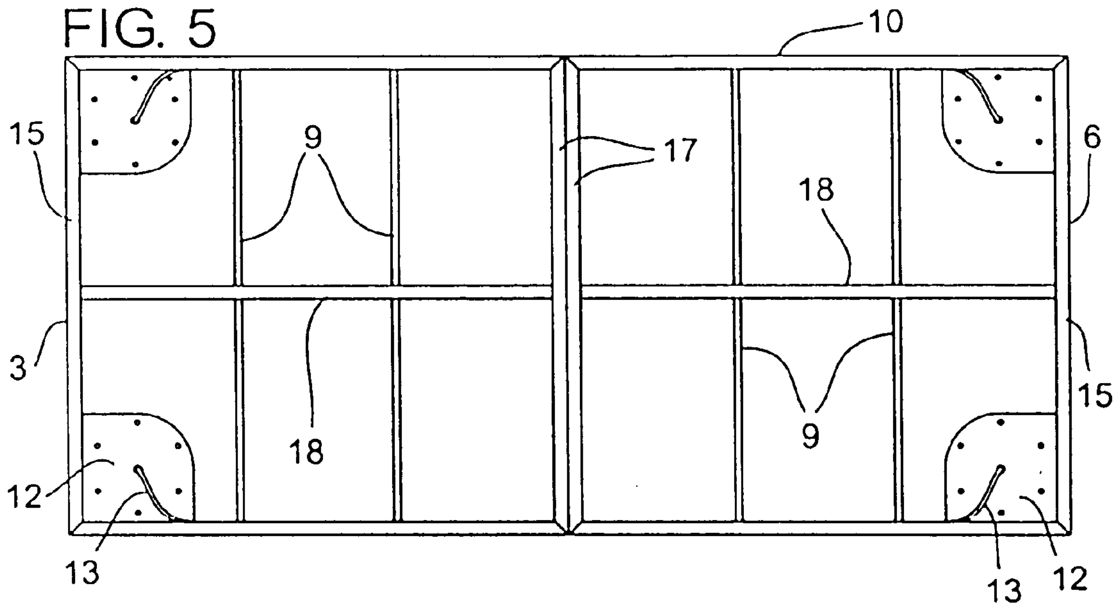
FIG. 5 is a top view of the front and rear halves of the instant invention, further illustrating individual air hoses use in association therewith to inflate expandable bellows.

FIG. 5 illustrates a top view of the front and rear halves of the mattress support arrangement, the invention's front 3 and rear half 6 are shown with their respective cross and longitudinal support members. Further illustrated in FIG. 5 is the top cushioned position plate 12 and the individual air hose means 13.

Figure 6:
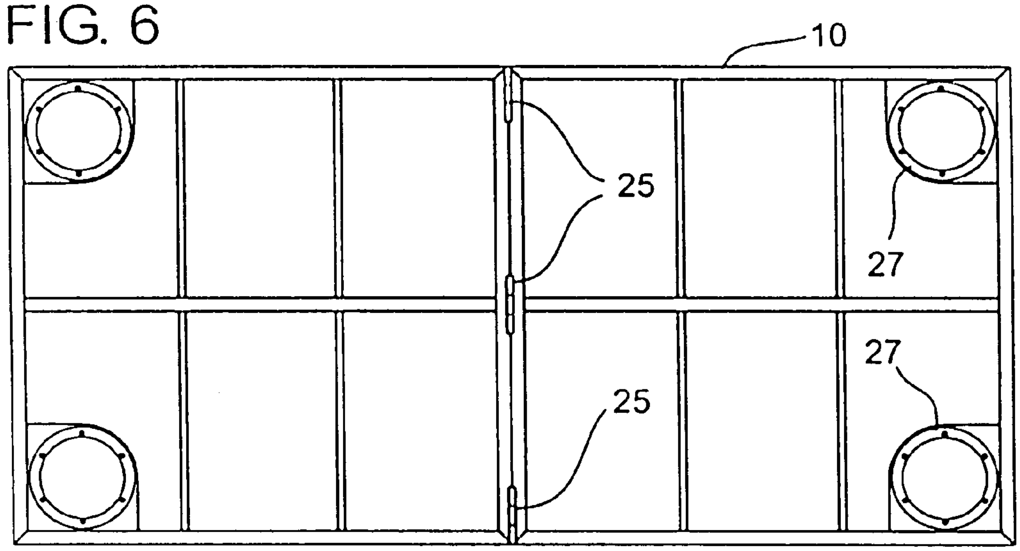
FIG. 6 is a bottom view of the mattress support structure of FIG. 5.

FIG. 6, the bottom view of the mattress support structure of FIG. 5, the pivotal connection means are shown 25, as are the bottom support members of the expandable cushions 27. Said bottom support members 27 are means well known by those skilled in the art to accommodate an expandable cushion means.

Figure 7:
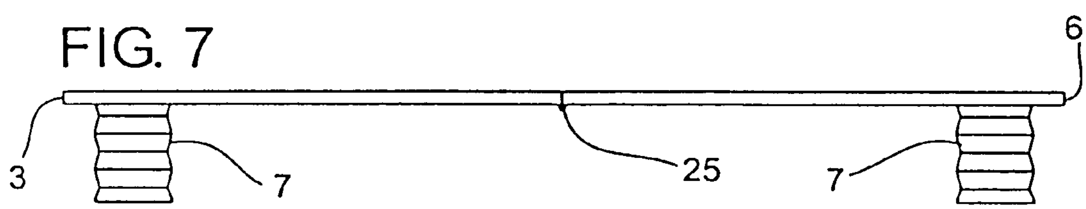
FIG. 7 is a side view of the mattress support system of FIGS. 5 and 6 showing inflated, expandable cushion means.

FIG. 7 illustrates a side view of the front and rear halves of the instant invention shown with cushions expanded to approximately equal heights.

Figure 8:
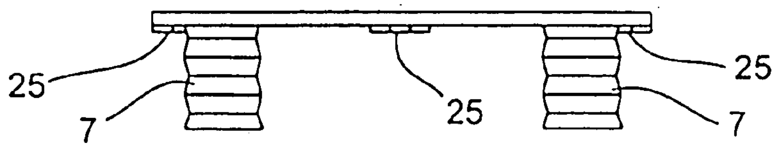
FIG. 8 is an end view of the mattress support system of FIGS. 5 and 6 showing expandable cushion means inflated to essentially equal levels.

FIG. 8 illustrates an end view of one embodiment of the instant invention shown with cushion 7 inflated or expanded to approximate equal heights.

Figure 9:
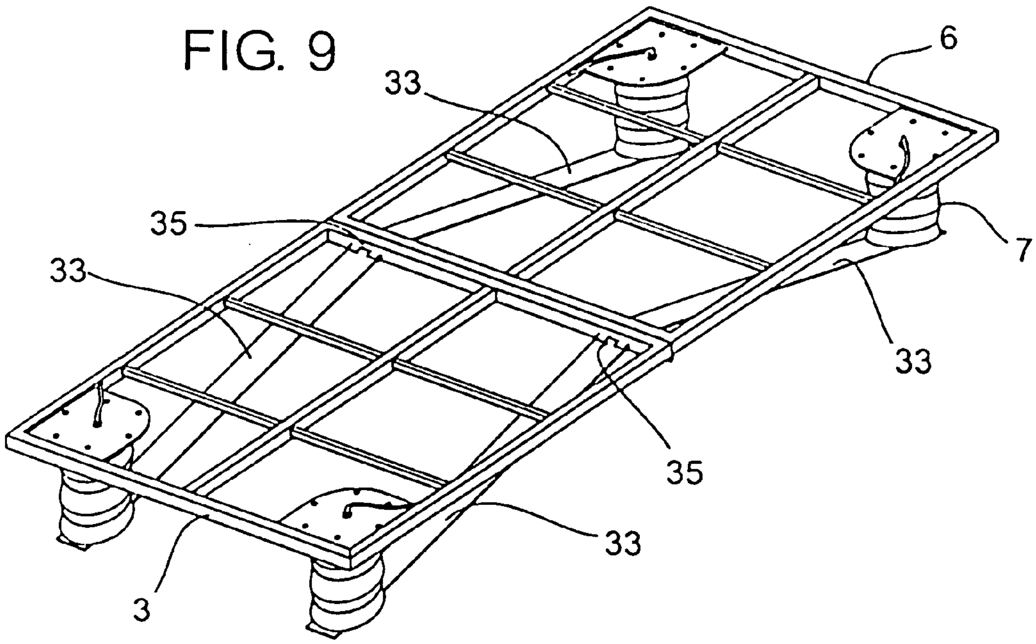
FIG. 9 is an alternative embodiment of the instant invention showing a plurality of additional support members.
Figure 10:
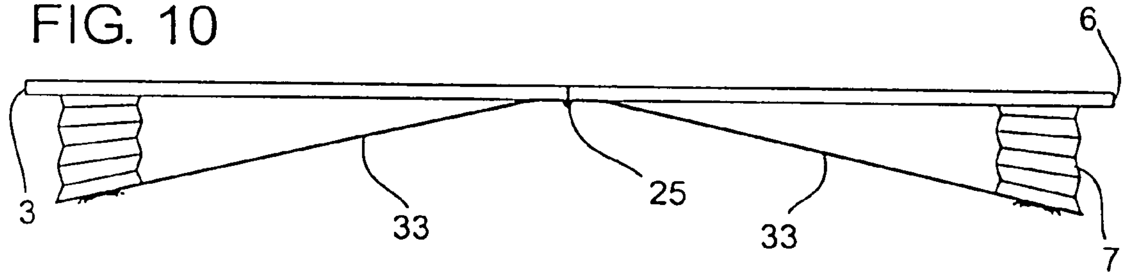
FIG. 10 is a side view of the alternate embodiment illustrated in FIG. 9.
Figure 11:
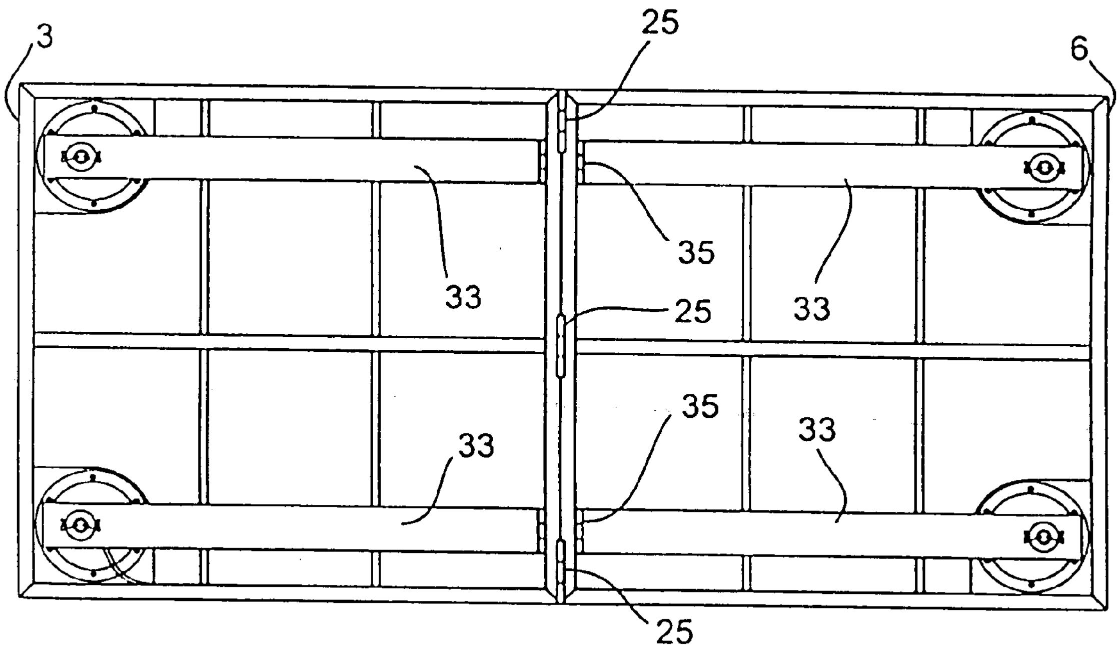
FIG. 11 is a bottom of the alternative embodiment illustrated in FIGS. 9 and 10.

FIGS. 9–10 illustrate an alternative embodiment of the instant invention. In FIGS. 9–10 it can be shown where a plurality of inclined support members 33 are further provided to assist in retaining smaller dimension expandable cushions in position once inflated. In so doing, the inclined support members 33 are attached to the bottom of the expandable cushions and rear support members 17 of each pivotally attached support member half. It is further shown in FIG. 11 where in addition to the hinge-like pivotal connections which facilitate connection of front and rear halves of the instant invention each of the inclines support member is attached to the rear support member 17 via a similarly constructed hinging mechanism 35.

While this invention has been described to illustrative embodiments, this description is not to be construed in a limiting sense. Various modifications and combinations of the illustrative embodiments as well as other embodiments will be apparent to those skilled in the art upon referencing this disclosure. It is therefore intended that this disclosure encompass any such modifications or embodiments.

ALTERNATE EMBODIMENTS

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents

What is claimed is:

1. An adjustable and transportable mattress support arrangement for adjustably supporting a mattress in the cab of a truck, comprising:

two elongated mattress support members for supporting said mattress each of said members having a distal end and a proximal end and being pivotally attached to each other at their proximal ends such that their distal ends comprise four corners of the arrangement;

four expandable gaseous fluid cushion means each being expandable and contractible in a vertical direction and removably positioned between a truck cab floor and a respective mattress support member, each of the cushion means being attached to one of the four corners of the arrangement;

means for applying a gaseous fluid under pressure to said expandable cushion means such that the gaseous fluid pressure is regulated such that each of the cushion means may have a different amount of pressure applied to it and whereby the vertical position of each mattress support member can be adjusted and whereby said mattress support members are supported by said expandable cushion means.

2. A support arrangement as defined in claim 1, wherein said mattress support arrangement may be folded for storage convenience.

3. The support arrangement of claim 1 wherein said elongated mattress support arrangement may be folded and attached in a non-permanent manner to the rearmost vertical wall of said truck cab.

4. A support arrangement as defined in claim 1 wherein said means for applying a gaseous fluid under pressure comprises:

a valving means connected to each of said expandable gaseous fluid cushion means and a pressurized air source used in association with a truck braking system.

5. A support arrangement as defined in claim 1 wherein said expandable gaseous fluid cushion means is an expandable air cushion.

* * * * *